United States Patent
Shi et al.

(10) Patent No.: US 11,201,786 B2
(45) Date of Patent: Dec. 14, 2021

(54) AUTO-CONFIGURATION METHOD AND APPARATUS, AND BASE STATION

(71) Applicant: HUAWEI TECHNOLOGIES CO., LTD., Guangdong (CN)

(72) Inventors: Zijuan Shi, Shanghai (CN); Yao Li, Shanghai (CN); Changchun Wen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/422,379

(22) Filed: May 24, 2019

(65) Prior Publication Data

US 2019/0280928 A1 Sep. 12, 2019

Related U.S. Application Data

(63) Continuation of application No. PCT/CN2016/107465, filed on Nov. 28, 2016.

(51) Int. Cl.
*H04L 12/24* (2006.01)
*H04W 16/18* (2009.01)
(Continued)

(52) U.S. Cl.
CPC .......... *H04L 41/0876* (2013.01); *H04L 41/12* (2013.01); *H04L 41/24* (2013.01);
(Continued)

(58) Field of Classification Search
CPC ..... H04L 41/0876; H04L 41/12; H04L 41/24; H04L 41/0813; H04L 41/0873;
(Continued)

(56) References Cited

U.S. PATENT DOCUMENTS

2009/0017864 A1 1/2009 Keevill et al.
2013/0331114 A1* 12/2013 Gormley ............... H04W 28/18
455/452.1
(Continued)

FOREIGN PATENT DOCUMENTS

CN 101094144 A 12/2007
CN 101166039 A 4/2008
(Continued)

OTHER PUBLICATIONS

Extended European Search Report issued in European Application No. 16922291.6 dated Oct. 23, 2019, 9 pages.
(Continued)

*Primary Examiner* — Jae Y Lee
(74) *Attorney, Agent, or Firm* — Fish & Richardson P.C.

(57) ABSTRACT

The present disclosure relates to auto-configuration methods and apparatus, and base stations. One example method includes determining physical configuration information of a base station, where the base station includes a control node and at least one hardware node, the physical configuration information of the base station indicates topology information and hardware attribute information of each node that needs to be configured, and nodes that need to be configured include at least one of the at least one hardware node, determining logical mapping configuration information of the base station, where the logical mapping configuration information of the base station indicates a mapping relationship between a hardware resource included in the base station and a logical resource corresponding to the hardware resource.

15 Claims, 3 Drawing Sheets

(51) Int. Cl.
*H04W 24/02* (2009.01)
*H04W 88/00* (2009.01)
*H04W 88/08* (2009.01)

(52) U.S. Cl.
CPC ........... *H04W 16/18* (2013.01); *H04W 24/02* (2013.01); *H04W 88/00* (2013.01); *H04W 88/08* (2013.01)

(58) Field of Classification Search
CPC .. H04L 41/0889; H04W 24/02; H04W 88/00; H04W 16/18; H04W 88/08
See application file for complete search history.

(56) References Cited

U.S. PATENT DOCUMENTS

| | | | |
|---|---|---|---|
| 2015/0271660 A1 | 9/2015 | Fengqian et al. | |
| 2016/0119932 A1 | 4/2016 | Cui et al. | |
| 2016/0198521 A1 | 7/2016 | Miller et al. | |
| 2016/0218912 A1* | 7/2016 | Vincze | H04L 41/0672 |
| 2018/0287696 A1* | 10/2018 | Barbieri | H04W 36/22 |
| 2018/0302807 A1* | 10/2018 | Chen | H04W 28/0268 |

FOREIGN PATENT DOCUMENTS

| | | |
|---|---|---|
| CN | 101278586 A | 10/2008 |
| CN | 101932143 A | 12/2010 |
| CN | 103297985 A | 9/2013 |
| CN | 103974287 A | 8/2014 |
| CN | 106162664 A | 11/2016 |
| EP | 1058989 B1 | 12/2004 |
| EP | 2288198 A2 | 2/2011 |
| WO | 2007128235 A1 | 11/2007 |
| WO | 2009094796 A1 | 8/2009 |
| WO | 2010076495 A1 | 7/2010 |
| WO | 2016168603 A1 | 10/2016 |

OTHER PUBLICATIONS

PCT International Search Report and Written Opinion in International Application No. PCT/CN2016/107465, dated Aug. 23, 3017, 17 pages (With English translation).
Anyi Wang et al, "A New Method of TD _ SCDMA Home Base Station Cell Configuration," Xi'an University of Science and Technology, Jul. 2009, 3 pages (English abstract).
Hurley et al, "Automatic Base Station Selection and Configuration in Mobile Networks," 52nd Vehicular Technology Conference, Sep. 2000, 8 pages.
Office Action issued in Chinese Application No. 201680090623.X dated Apr. 16, 2020, 10 pages (with English translation).
Office Action issued in Indian Application No. 201947020932 dated Feb. 26, 2021, 6 pages.
Office Action issued in Canadian Application No. 3,045,198 dated Aug. 19, 2021, 4 pages.

* cited by examiner

AUTO-CONFIGURATION METHOD AND APPARATUS, AND BASE STATION

CROSS-REFERENCE TO RELATED APPLICATIONS

This application is a continuation of International Application No. PCT/CN2016/107465, filed on Nov. 28, 2016, the disclosure of which is hereby incorporated by reference in its entirety.

TECHNICAL FIELD

This application relates to the communications field, and more specifically, to an auto-configuration method and apparatus, and a base station.

BACKGROUND

A base station in a wireless communications system includes a control node and a hardware node. The control node may be a baseband unit (BBU). The hardware node may be a remote radio unit (RRU) or a HUB, and the HUB may be a router or a hub. After the hardware node is powered on and started, the system needs to complete link configuration between hardware, hardware attribute configuration, and mapping configuration between a hardware resource and a logical resource. Then, the hardware node can properly transmit a service.

In the prior art, the foregoing configuration process is completed by using an network management system (NMS) or manually according to a design and planning drawing. To be specific, the link configuration between hardware, the hardware attribute configuration, and the mapping configuration between a hardware resource and a logical resource need to be manually completed one by one. However, with the advent of a 5G era, base stations are deployed increasingly densely, and a quantity of hardware nodes is also increasing. If a base station is still configured in the foregoing method, a workload is very large, and correspondingly, configuration duration of the base station is also very long. Therefore, a configuration solution is urgently required, to shorten the configuration duration of the base station.

SUMMARY

Embodiments of this application provide an auto-configuration method and apparatus, and a base station, to shorten configuration duration of a base station.

According to a first aspect, an auto-configuration method is provided, and the method includes: determining physical configuration information of a base station, where the base station includes a control node and at least one hardware node, the physical configuration information of the base station indicates topology information and hardware attribute information of each node that needs to be configured, and all the nodes that need to be configured include some or all of the at least one hardware node; determining logical mapping configuration information of the base station, where the logical mapping configuration information of the base station indicates a mapping relationship between a hardware resource included in the base station and a logical resource corresponding to the hardware resource, and the hardware resource includes each node that needs to be configured; and sending the physical configuration information of the base station and the logical mapping configuration information of the base station to the base station, so that the base station configures, based on the physical configuration information of the base station and the logical mapping configuration information of the base station, each node that needs to be configured.

It should be understood that the auto-configuration method in this embodiment of this application may be performed by an auto-configuration apparatus. The auto-configuration apparatus may be a software program, a hardware module, a combination of a software program and a hardware module, or the like. This is not limited in this embodiment of this application.

Optionally, all the nodes that need to be configured may include the at least one hardware node included in an actual connection relationship in the base station, or may be nodes that are determined by the auto-configuration apparatus based on a user requirement in the at least one hardware node included in the base station and that need to be configured. In other words, an actually connected node may not be configured to transmit a service, and therefore, the node may not be configured.

Optionally, the auto-configuration apparatus may prestore configuration information of the base station, and the prestored configuration information of the base station may be used to configure a node in the base station. To be specific, the auto-configuration apparatus may determine the prestored configuration information of the base station as the physical configuration information of the base station, and then send the physical configuration information of the base station to the base station, so that the base station performs physical configuration on the node in the base station based on the physical configuration information of the base station.

Optionally, the auto-configuration apparatus may further determine the logical mapping configuration information of the base station, and the logical mapping configuration information of the base station is used to determine the logical resource corresponding to the hardware resource included in the base station.

Optionally, the physical configuration information of the base station may further include topology information and hardware attribute information of the control node, and the logical mapping configuration information of the base station may further include a logical resource corresponding to the control node. This is not limited in this embodiment of this application.

In a possible implementation, the determining physical configuration information of a base station includes: receiving inventory configuration information of the base station that is sent by the base station, where the inventory configuration information of the base station includes inventory configuration information of the at least one hardware node, and inventory configuration information of each hardware node indicates topology information and hardware attribute information of each hardware node; and determining the physical configuration information of the base station based on the inventory configuration information of the base station.

In an actual system, the prestored configuration information of the base station may not match an actual connection status of a hardware node in the base station. Therefore, the auto-configuration apparatus may determine an actual connection status, namely, the topology information, of each hardware node based on the inventory configuration information of the base station, so as to update the prestored configuration information of the base station based on the topology information, and determine updated prestored configuration information of the base station as the physical configuration information of the base station. Therefore, the physical configuration information of the base station can reflect the actual connection status of the hardware node, thereby avoiding a problem that the base station cannot work because the configuration information and the actual connection status do not match.

Further, the auto-configuration apparatus may determine, based on a user requirement, a specific node that needs to be configured. In other words, the auto-configuration apparatus may be used by a user to select the node to be configured. Then, the auto-configuration apparatus configures, based on user selection and with reference to the inventory configuration information of the base station, the hardware node selected by the user. Therefore, flexibility of configuration of the base station is further improved.

In a possible implementation, the determining the physical configuration information of the base station based on the inventory configuration information of the base station includes: comparing the inventory configuration information of the base station with prestored configuration information of the base station; newly adding configuration information of a first hardware node to the prestored configuration information of the base station based on inventory configuration information of the first hardware node if the inventory configuration information of the base station includes the inventory configuration information of the first hardware node and the prestored configuration information of the base station includes no configuration information of the first hardware node; determining inventory configuration information of a second hardware node as configuration information of the second hardware node in the prestored configuration information of the base station if the inventory configuration information of the second hardware node that is included in the inventory configuration information of the base station is inconsistent with the configuration information of the second hardware node that is included in the prestored configuration information of the base station; deleting configuration information of a third hardware node in the prestored configuration information of the base station if the inventory configuration information of the base station includes no inventory configuration information of the third hardware node and the prestored configuration information of the base station includes the configuration information of the third hardware node; keeping configuration information of a fourth hardware node in the prestored configuration information of the base station if inventory configuration information of the fourth hardware node that is included in the inventory configuration information of the base station is consistent with the configuration information of the fourth hardware node that is included in the prestored configuration information of the base station; and determining updated prestored configuration information of the base station as the physical configuration information of the base station.

Therefore, the auto-configuration apparatus can determine the physical configuration information of the base station based on the updated prestored configuration information of the base station. The physical configuration information of the base station can reflect the actual connection status of the hardware node, thereby avoiding a problem that the base station cannot work because the configuration information and the actual connection status do not match.

In a possible implementation, the determining logical mapping configuration information of the base station includes: determining a quantity of nodes that need to be configured; determining a quantity of available logical resources; and determining the mapping relationship according to a hardware resource equal-allocation principle if the quantity of nodes that need to be configured is greater than the quantity of available logical resources; or determining the mapping relationship according to a logical resource equal-allocation principle if the quantity of nodes that need to be configured is not greater than the quantity of available logical resources.

Optionally, the auto-configuration apparatus may alternatively determine the mapping relationship according to the hardware resource equal-allocation principle or the logical resource equal-allocation principle and with reference to a principle of minimizing resource occupation, and the minimizing resource occupation means minimizing occupation on a resource such as a baseband or an optical fiber.

Optionally, the auto-configuration apparatus may further determine a corresponding logical resource based on a location relationship between hardware resources, for example, try to enable hardware resources on adjacent ports to correspond to a same logical resource.

Optionally, the logical mapping configuration information of the base station is represented by using a mapping relationship between an equipment serial number of each node that needs to be configured and a logical resource corresponding to each node that needs to be configured, and all the nodes that need to be configured are in a one-to-one correspondence with the equipment serial numbers of all the nodes that need to be configured.

It should be understood that, the auto-configuration apparatus may alternatively establish the mapping relationship, namely, the logical mapping configuration information, between a hardware resource and a logical resource based on other identifier information that can uniquely identify a hardware node. This is not limited in this embodiment of this application.

In a possible implementation, the method further includes: receiving configuration change information sent by the base station, where the configuration change information indicates that physical configuration information of the at least one hardware node changes; and determining incremental configuration information of the base station based on the configuration change information, where the incremental configuration information of the base station is used to configure the at least one hardware node that changes.

Therefore, according to the auto-configuration method in this embodiment of this application, when the physical configuration information of the hardware node in the base station changes, the base station sends the configuration change information to the auto-configuration apparatus, so that after receiving the configuration change information, the auto-configuration apparatus may determine the incremental configuration information of the base station based on the configuration change information. Changed physical configuration information is not used to reconfigure all hardware nodes. Instead, the incremental configuration information of the base station is used by the base station to configure only a changed hardware node. Therefore, when physical configuration information of some nodes in the base station changes, configuration duration of the base station is further shortened.

According to a second aspect, an auto-configuration method is provided, and the method includes: obtaining, by a base station, inventory configuration information of the base station, where the base station includes a control node and at least one hardware node, the inventory configuration information of the base station includes inventory configuration information of the at least one hardware node, and inventory configuration information of each hardware node indicates topology information and hardware attribute information of each hardware node; sending, by the base station, the inventory configuration information of the base station to an auto-configuration apparatus, where the inventory configuration information of the base station is used to determine physical configuration information of the base station, the physical configuration information of the base station indicates topology information and hardware attribute information of each node that needs to be configured, and all the nodes that need to be configured include some or all of the at least one hardware node; receiving, by the base station, the physical configuration information of the base station and logical mapping configuration information of the base station that are sent by the auto-configuration apparatus, where the logical mapping configuration information of the base station indicates a mapping relationship between a hardware resource included in the base station and a logical resource corresponding to the hardware resource, and the hardware resource includes each node that needs to be configured; and configuring, by the base station based on the physical configuration information of the base station and the logical mapping configuration information of the base station, each node that needs to be configured.

Optionally, the inventory configuration information of the base station can reflect an actual connection relationship between hardware nodes included in the base station. Therefore, the base station sends the inventory configuration information to the auto-configuration apparatus, so that the auto-configuration apparatus determines the physical configuration information of the base station based on the inventory configuration information. The physical configuration information of the base station is the topology information and the hardware attribute information of each node that needs to be configured in the base station. Each node that needs to be configured is a node that is determined by the auto-configuration apparatus and that is configured to transmit a service.

Optionally, all the nodes that need to be configured may include each node included in the actual connection relationship in the base station. In this case, the auto-configuration apparatus may configure each actually connected node.

Alternatively, each node that needs to be configured may be a node that is determined by the auto-configuration apparatus based on a user requirement and that needs to be configured. In other words, an actually connected node may not be configured to transmit a service, and therefore, the node may not be configured. Therefore, the auto-configuration apparatus may configure an actually connected node in the base station based on an actual connection relationship, or may configure, based on a user requirement, a hardware node selected by a user. In this way, system configuration flexibility is further improved.

In a possible implementation, the obtaining, by a base station, inventory configuration information of the base station includes: obtaining, by the control node, a relative location of the at least one hardware node by scanning the at least one hardware node; obtaining, by the control node, topology information of the at least one hardware node based on the relative location of the at least one hardware node; and obtaining, by the control node, hardware attribute information of the at least one hardware node based on identifier information of the at least one hardware node, where the identifier information of the at least one hardware node is in a one-to-one correspondence with the at least one hardware node.

Therefore, the control node in the base station may obtain the topology information and the hardware attribute information of each hardware node by scanning each hardware node. Therefore, the topology information of the hardware node that is obtained by the base station can reflect an actual connection relationship among all hardware nodes, so as to avoid a prior art problem that a configured hardware node cannot properly work because configuration data and an actual connection relationship do not match due to configuration of the hardware node that is performed by using an NMS or a planning drawing.

In a possible implementation, the logical mapping configuration information of the base station is represented by using a mapping relationship between an equipment serial number of each node that needs to be configured and a logical resource corresponding to each node that needs to be configured, and all the nodes that need to be configured are in a one-to-one correspondence with the equipment serial numbers of all the nodes that need to be configured.

According to a third aspect, an auto-configuration apparatus is provided, configured to perform the method in any one of the first aspect or the possible implementations of the first aspect. Specifically, the auto-configuration apparatus may include units configured to perform the method in any one of the first aspect or the possible implementations of the first aspect.

According to a fourth aspect, a base station is provided, configured to perform the method in any one of the second aspect or the possible implementations of the second aspect. Specifically, the base station may include units configured to perform the method in any one of the second aspect or the possible implementations of the second aspect.

According to a fifth aspect, an auto-configuration apparatus is provided, including a memory and a processor. The memory is configured to store an instruction, and the processor is configured to execute the instruction stored in the memory. In addition, execution of the instruction stored in the memory enables the processor to perform the method in any one of the first aspect or the possible implementations of the first aspect.

According to a sixth aspect, a base station is provided, including a memory and a processor. The memory is configured to store an instruction, and the processor is configured to execute the instruction stored in the memory. In addition, execution of the instruction stored in the memory enables the processor to perform the method in any one of the second aspect or the possible implementations of the second aspect.

According to a seventh aspect, a computer-readable storage medium is provided, configured to store a computer program. The computer program includes an instruction for performing any method in any one of the first aspect, the second aspect, or the possible implementations of the first aspect or the second aspect.

Based on the foregoing technical solutions, according to the auto-configuration method in the embodiments of this application, the auto-configuration apparatus may determine the physical configuration information of the base station and the logical mapping configuration information of the base station, and then send the determined physical configuration information and logical mapping configuration information of the base station to the base station. In this way, the base station can configure, based on the physical configuration information and the logical mapping configuration information of the base station, each node that needs to be configured in the base station. Therefore, the control node and each hardware node included in the base station do not need to be manually configured one by one, so that configuration duration of the base station can be shortened.

DESCRIPTION OF EMBODIMENTS

The following clearly describes the technical solutions in the embodiments of this application with reference to the accompanying drawings in the embodiments of this application.

It should be understood that the technical solutions of this application may be applied to various communications systems, for example, a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), and a 5G new radio (NR) system.

Figure 1:
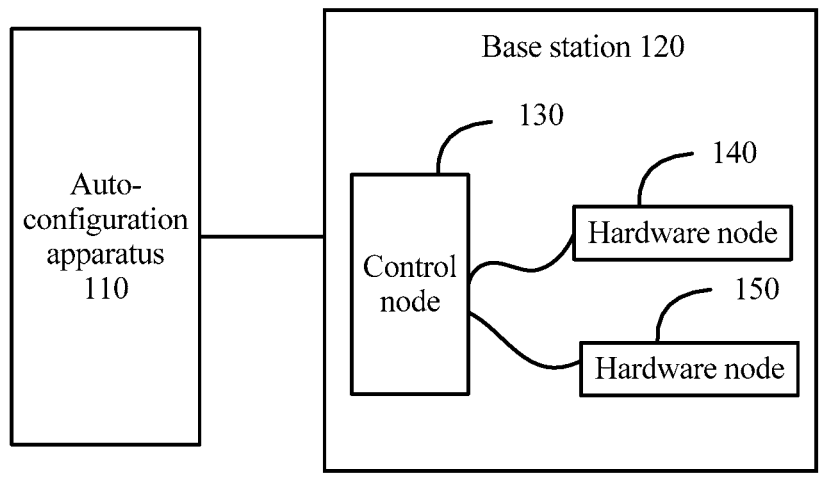
FIG. 1 is a schematic architectural diagram of a communications system applicable to an embodiment of this application.

FIG. 1 shows a communications system 100 applicable to an embodiment of this application. As shown in FIG. 1, the communications system 100 may include an auto-configuration apparatus 110 and at least one base station, for example, a base station 120 shown in FIG. 1. The base station 120 may be a base transceiver station (BTS) in a GSM or CDMA, may be a NodeB (NB) in WCDMA, or may be an evolved NodeB (eNB or e-NodeB) in LTE. This is not limited in this embodiment of this application.

The base station 120 may include a control node 130 and at least one hardware node, for example, a hardware node 140 and a hardware node 150 shown in FIG. 1. These hardware nodes may be directly connected to the control node 130 by using an optical fiber or a network cable, or may be indirectly connected to the control node 130 by using another hardware node. The control node 130 may communicate with each hardware node in the base station.

The control node 130 may be a baseband unit (BBU). The hardware node may be an RRU or a HUB, and the HUB may be a router or a hub. The base station 120 may include one or more RRUs, the RRUs may be directly connected to the control node, or may be connected to the control node by using a HUB, and the RRUs may be cascaded. The auto-configuration apparatus 110 may perform physical configuration and logical configuration on the control node and the hardware node included in the base station. The physical configuration is mainly used to configure hardware attributes of the control node and the hardware node, and a topology relationship between the control node and the hardware node. The logical configuration is mainly used to bind a hardware resource to a corresponding logical resource.

It should be noted that, in this embodiment of this application, the auto-configuration apparatus may be a software program, a hardware module, a combination of a software program and a hardware module, or the like. This is not limited in this embodiment of this application. Optionally, the auto-configuration apparatus may be an operations support subsystem (OSS).

It should be understood that, a connection relationship between the control node and the hardware node shown in FIG. 1, a quantity of hardware nodes, and a quantity of base stations are merely an example, and are not intended to limit the protection scope of this embodiment of this application. An actual communications system may further include more base stations, or may include more hardware nodes or the like. This is not limited in this embodiment of this application.

An auto-configuration method according to an embodiment of this application is described below in detail with reference to FIG. 2.

Figure 2:
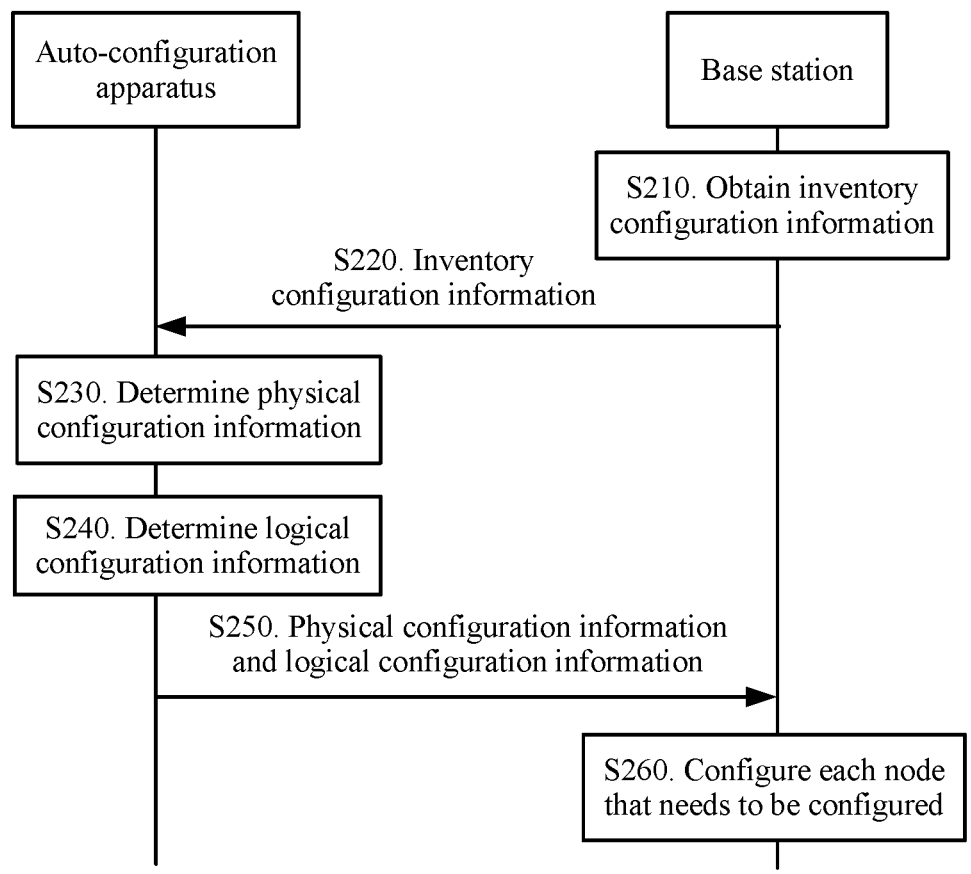
FIG. 2 is a schematic flowchart of an auto-configuration method according to an embodiment of this application.

It should be understood that FIG. 2 is a schematic flowchart of an auto-configuration method according to an embodiment of this application, and shows detailed communication steps or operations of the method. However, these steps or operations are merely an example. Other operations or variations of the operations in FIG. 2 may be further performed in this embodiment of this application. In addition, the steps in FIG. 2 may be separately performed in a sequence different from that shown in FIG. 2, and possibly, not all the operations in FIG. 2 need to be performed.

FIG. 2 is a schematic flowchart of an auto-configuration method 200, described from a perspective of device interaction, according to an embodiment of this application. The method 200 may be applied to the communications system 100 shown in FIG. 1.

As shown in FIG. 2, the method 200 includes the following steps.

S210. A base station obtains inventory configuration information of the base station, where the base station includes a control node and at least one hardware node, the inventory configuration information of the base station includes inventory configuration information of the at least one hardware node, and inventory configuration information of each hardware node indicates topology information and hardware attribute information of each hardware node.

Specifically, the base station includes the control node and the at least one hardware node. After the control node and the at least one hardware node are powered on and started, physical configuration and logical configuration need to be performed on the control node and the at least one hardware node, to properly transmit a service. The physical configuration is used to configure topology information and hardware attribute information of the control node and the at least one hardware node. The logical configuration is used to configure logical resources that can be used by the control node and the at least one hardware node to transmit a service, that is, logical resources corresponding to the control node and the at least one hardware node. To implement the physical configuration on the control node and the at least one hardware node, the inventory configuration information of the base station needs to be obtained, and the inventory configuration information of the base station includes topology information and hardware attribute information of the at least one hardware node. The inventory configuration information of the base station may be used by an auto-configuration apparatus to determine physical configuration information of the base station. The physical configuration information of the base station is topology information and hardware attribute information of each node that needs to be configured in the base station. Each node that needs to be configured is a node that is determined by the auto-configuration apparatus and that is configured to transmit a service. All the nodes that need to be configured may be the at least one hardware node, or may be nodes that are determined by the auto-configuration apparatus in the at least one hardware node based on a user requirement and that need to be configured. In other words, all the nodes that need to be configured may be some or all of the at least one hardware node.

Optionally, in an embodiment, S210 may further include:
  obtaining, by the control node, a relative location of the at least one hardware node by scanning the at least one hardware node;
  obtaining, by the control node, topology information of the control node and the at least one hardware node based on the relative location of the at least one hardware node; and
  obtaining, by the control node, hardware attribute information of the at least one hardware node based on identifier information of the at least one hardware node, where the identifier information of the at least one hardware node is in a one-to-one correspondence with the at least one hardware node.

Specifically, each hardware node in the base station is indicated by using a relative location. The control node may obtain the relative location of each hardware node by successively scanning all hardware nodes, so as to obtain the topology information of each hardware node.

Optionally, the topology information and the hardware attribute information of the hardware node in the base station may be obtained by the control node by scanning each hardware node. After the control node obtains the topology information and the hardware attribute information of each hardware node, the control node may further generate topology information and corresponding hardware attribute information of the control node. Therefore, the inventory configuration information of the base station may further include the topology information and the hardware attribute information of the control node. The topology information and the attribute information of the control node may be used by the auto-configuration apparatus to configure a topology relationship and a hardware attribute of the control node.

Figure 3:
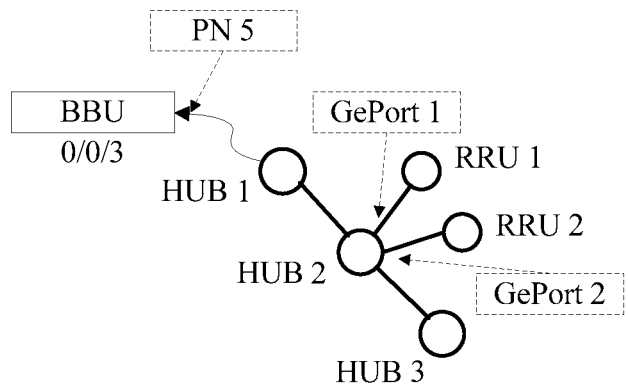
FIG. 3 is a diagram of a topology structure of an example base station.

The following uses a topology structure shown in FIG. 3 as an example to describe in detail how the base station obtains topology information of nodes shown in FIG. 3.

In FIG. 3, an action of scanning each hardware node may be performed by a control node BBU shown in FIG. 3. The BBU initiates a hardware node scanning process. The BBU first finds that an optical port 5 (namely, a PN 5 shown in FIG. 3) of the BBU is connected to a HUB 1, then continues to perform scanning downwards from the HUB 1, and determines that the HUB 1 is connected to a HUB 2. Subsequently, the BBU successively performs scanning downwards, and learns that a HUB 3 is connected to the HUB 2. In addition, an optical port 1 (namely, a GePort 1 in FIG. 3) of the HUB 2 is connected to an RRU 1, and an optical port 2 (namely, a GePort 2 in FIG. 3) is connected to an RRU 2. Therefore, a connection status of each hardware node and information about a connected port are obtained, so that the topology information of the control node and each hardware node in the base station is determined.

Optionally, the topology information of each hardware node may be represented by using an attribute of the control node connected to the hardware node, information about a port connected to the hardware node, level information, and the like. For example, the attribute of the control node may indicate a specific control node that controls the hardware connection. The attribute of the control node may be information about a cabinet number, a subrack number, and a slot ID of the BBU. If the hardware node is an RRU, the information about the port connected to the hardware node may include a port number of a HUB connected to the hardware node. If the hardware node is a HUB, the information about the port connected to the hardware node may include a port number of an RRU connected to the hardware node.

For example, the topology information of each hardware node in the base station may be represented in a manner shown in Table 1.

TABLE 1

|  | CN | SRN | SN | PN | mianLevel | GePort | Hop |
|---|---|---|---|---|---|---|---|
| RHUB 1 | 0 | 0 | 3 | 5 | 0 | 0 | 0 |
| RHUB 2 | 0 | 0 | 3 | 5 | 1 | 0 | 1 |
| RHUB 3 | 0 | 0 | 3 | 5 | 2 | 0 | 2 |
| PRRU 1 | 0 | 0 | 3 | 5 | 1 | 1 | 0 |
| PRRU 2 | 0 | 0 | 3 | 5 | 1 | 2 | 0 |

In Table 1, the CN, SRN, and SR are used to describe the attribute of the control node BBU. The CN, SRN, and SR respectively indicate the information about the cabinet number, the subrack number, and the slot ID of the BBU. The PN indicates an optical port number, that is, a specific optical port that is of the BBU and to which the hardware node is connected. In other words, information in first four columns is used to describe attribute information of the control node. The mianLevel indicates cascading level information, the GePort indicates an optical port number of a connected HUB, and the HOP indicates a port number of a connected RRU.

Therefore, the topology information of the control node and the hardware node in FIG. 3 may be represented in the manner shown in Table 1. Optionally, an identifier of a hardware node in a leftmost column of Table 1 may be an identifier that can uniquely indicate the hardware node. For example, information such as a bill of materials (BOM) code of the hardware node may be used to identify the hardware node.

Optionally, the hardware attribute information of each hardware node may be stored in a storage unit of the hardware node, or may be stored in a storage unit of the control node. If the hardware attribute information of each hardware node is stored in a storage unit of each hardware node, the control node may obtain the hardware attribute information of each hardware node by scanning each hardware node.

Optionally, the hardware attribute information of the hardware node may include identifier information of the hardware node, and identifier information of hardware nodes are in a one-to-one correspondence with the hardware nodes. Therefore, a hardware node can be uniquely determined based on identifier information of the hardware node. Optionally, the hardware attribute information of each hardware node may include information such as a module name, a configuration type, a quantity of transmit ports, a quantity of receive ports, an RRU type (RT), and an RRU working standard (RS). The hardware attribute information of each hardware node may be represented in a manner shown in Table 2.

TABLE 2

| Module name | Configuration type | BOM code | RT | RS |
|---|---|---|---|---|
| RHUB 3908 | RHUB | 02310UXU | | |
| RHUB 3908 | RHUB | 02310LUN | | |
| RHUB 3908 | RHUB | 02311HDH | | |
| PRRU 3901 | PRRU | 02310YBS | MPMU | ULFTD |
| PRRU 3901 | PRRU | 02310VAE | MPMU | ULFTD |

It can be learned from Table 2 that the identifier information may be BOM code information of the hardware node. Different BOM codes may be configured for all hardware nodes to distinguish different hardware nodes, so that the hardware attribute information of each hardware node may be obtained based on the BOM codes. For example, other hardware attribute information of the hardware node may be determined based on a BOM code 02310YBS. For example, a module name is PRRU 3901, a configuration type is PRRU, an RT is MPMU, and an RS is ULFTD. It should be understood that a null part in Table 2 indicates that the hardware node does not have corresponding hardware attribute information.

Therefore, the control node in the base station may obtain the topology information and the hardware attribute information of each hardware node by scanning each hardware node. Therefore, the topology information of the hardware node that is obtained by the base station can reflect an actual connection relationship among all hardware nodes, so as to avoid a prior art problem that a configured hardware node cannot properly work because configuration data and an actual connection relationship do not match due to configuration of the hardware node that is performed by using an NMS or a planning drawing.

S220. The base station sends the inventory configuration information of the base station to an auto-configuration apparatus.

Specifically, after the base station is powered on and started, the auto-configuration apparatus may establish an inventory data channel with the base station. After obtaining the inventory configuration information of the base station, the base station may send the inventory configuration information to the auto-configuration apparatus through the inventory data channel, so that the auto-configuration apparatus can generate the physical configuration information of the base station based on the inventory configuration information of the base station.

S230. The auto-configuration apparatus determines physical configuration information of the base station, where the base station includes the control node and the at least one hardware node, the physical configuration information of the base station indicates topology information and hardware attribute information of each node that needs to be configured, and all the nodes that need to be configured include some or all of the at least one hardware node.

Specifically, all the nodes that need to be configured may include each hardware node included in an actual connection relationship in the base station, or may be nodes that are determined by the auto-configuration apparatus based on a user requirement and that need to be configured. In other words, an actually connected node may not be configured to transmit a service, and therefore, the node may not be configured. The auto-configuration apparatus may prestore configuration information of the base station, and the prestored configuration information of the base station may be used to configure a node in the base station. To be specific, the auto-configuration apparatus may determine the prestored configuration information of the base station as the physical configuration information of the base station, and then send the physical configuration information of the base station to the base station, so that the base station performs physical configuration on the node in the base station based on the physical configuration information of the base station.

Optionally, S230 may specifically include:

determining the physical configuration information of the base station based on the inventory configuration information of the base station.

Specifically, because the prestored configuration information of the base station may not match an actual connection status of hardware node in the base station, the auto-configuration apparatus may determine, based on the inventory configuration information of the base station, the actual connection status, namely, the topology information, of the node included in the base station, so as to update the prestored configuration information of the base station based on the topology information. Alternatively, the auto-configuration apparatus may determine, based on a user requirement, a specific node that needs to be configured, and then configure, based on the inventory configuration information of the base station, the node that is determined by a user and that needs to be configured. In other words, the auto-configuration apparatus may be used by the user to select the node to be configured. Therefore, flexibility of configuration of the base station is further improved.

Optionally, the determining the physical configuration information of the base station based on the inventory configuration information of the base station may specifically include:

comparing the inventory configuration information of the base station with prestored configuration information of the base station;

newly adding configuration information of a first hardware node to the prestored configuration information of the base station based on inventory configuration information of the first hardware node if the inventory configuration information of the base station includes the inventory configuration information of the first hardware node and the prestored configuration information of the base station includes no configuration information of the first hardware node;

determining inventory configuration information of a second hardware node as configuration information of the second hardware node in the prestored configuration information of the base station if the inventory configuration information of the second hardware node that is included in the inventory configuration information of the base station is inconsistent with the configuration information of the second hardware node that is included in the prestored configuration information of the base station;

deleting configuration information of a third hardware node in the prestored configuration information of the base station if the inventory configuration information of the base station includes no inventory configuration information of the third hardware node and the prestored configuration information of the base station includes the configuration information of the third hardware node;

keeping configuration information of a fourth hardware node in the prestored configuration information of the base station if inventory configuration information of the fourth hardware node that is included in the inventory configuration information of the base station is consistent with the configuration information of the fourth hardware node that is included in the prestored configuration information of the base station; and determining updated prestored configuration information of the base station as the physical configuration information of the base station.

Specifically, after obtaining the inventory configuration information of the base station, the auto-configuration apparatus compares the inventory configuration information of the base station with the prestored configuration information of the base station, and determines the physical configuration information of the base station based on a difference between the inventory configuration information of the base station and the prestored configuration information of the base station. Therefore, consistency between actually installed hardware and the prestored configuration information can be ensured.

Optionally, if the actual connection relationship includes the first hardware node, to be specific, the inventory configuration information of the base station includes the inventory configuration information of the first hardware node, but the prestored configuration information of the base station includes no configuration information of the first hardware node, the configuration information of the first hardware node is newly added to the prestored configuration information of the base station, and the newly added configuration information of the first hardware node may be determined based on the inventory configuration information of the first hardware node that is included in the inventory configuration information of the base station.

Optionally, if the auto-configuration apparatus finds, through comparison, that the inventory configuration information of the second hardware node that is included in the inventory configuration information of the base station is inconsistent with the configuration information of the second hardware node that is included in the prestored configuration information of the base station, the auto-configuration apparatus may notify the user that the configuration information of the second hardware node is inconsistent with the inventory configuration information, so that the user selects specific configuration information, and configures the second hardware node based on the configuration information. Alternatively, the auto-configuration apparatus may directly determine to configure the second hardware node based on the inventory configuration information of the second hardware node that is reported by the base station, to be specific, determine the inventory configuration information of the second hardware node as the configuration information of the second hardware node in the prestored configuration information of the base station, in other words, update the configuration information of the second hardware node in the prestored configuration information of the base station by using the inventory configuration information of the second hardware node.

Optionally, if the inventory configuration information of the base station includes no inventory configuration information of the third hardware node, in other words, the actual connection relationship includes no third hardware node, but the prestored configuration information of the base station includes the configuration information of the third hardware node, the auto-configuration apparatus may notify the user that the actual connection relationship includes no third hardware node, so that the user chooses to delete or keep the configuration information of the third hardware node, or the auto-configuration apparatus may directly determine to delete the configuration information of the third hardware node in the prestored configuration information of the base station.

Optionally, if the inventory configuration information of the fourth hardware node that is included in the inventory configuration information of the base station is consistent with the configuration information of the fourth hardware node that is included in the prestored configuration information of the base station, the auto-configuration apparatus may determine to keep the configuration information of the fourth hardware node.

Finally, the auto-configuration apparatus determines the updated prestored configuration information of the base station as the physical configuration information of the base station. Therefore, the physical configuration information of the base station can reflect the actual connection status of the hardware node, thereby avoiding a problem that the base station cannot work because the configuration information and the actual connection status do not match.

S240. The auto-configuration apparatus determines logical mapping configuration information of the base station, where the logical mapping configuration information of the base station indicates a mapping relationship between a hardware resource included in the base station and a logical resource corresponding to the hardware resource, and the hardware resource includes each node that needs to be configured.

Specifically, the hardware resource may be some or all of the at least one hardware node included in the base station. After the auto-configuration apparatus determines the physical configuration information of the base station, the auto-configuration apparatus may determine the logical mapping configuration information of the base station. The logical mapping configuration information of the base station indicates the mapping relationship between a hardware resource included in the base station and a logical resource corresponding to the hardware resource, and the logical mapping configuration information of the base station may be used to determine a logical resource that can be used by each node that needs to be configured to transmit a service. Therefore, the auto-configuration apparatus may send the logical mapping configuration information of the base station to the base station, so that the base station can configure, for each node that needs to be configured, the logical resource that can be used by the node to transmit a service.

Optionally, S240 may specifically include:

determining a quantity of nodes that need to be configured;

determining a quantity of available logical resources; and determining the mapping relationship according to a hardware resource equal-allocation principle if the quantity of nodes that need to be configured is greater than the quantity of available logical resources; or determining the mapping relationship according to a logical resource equal-allocation principle if the quantity of nodes that need to be configured is not greater than the quantity of available logical resources.

How the auto-configuration apparatus determines the mapping relationship according to the hardware resource equal-allocation principle or the logical resource equal-allocation principle is described below with reference to a specific embodiment.

For example, logical resources of the base station include a cell 0 and a cell 1, and hardware resources of the base station include an RRU 0 to an RRU 5. In this case, a quantity 6 of hardware resources is greater than a quantity 2 of logical resources, and then the auto-configuration apparatus may establish, according to the hardware resource equal-allocation principle, a mapping relationship shown in Table 3.

TABLE 3

| | Hardware resource | | | | | |
|---|---|---|---|---|---|---|
| | RRU 0 | RRU 1 | RRU 2 | RRU 3 | RRU 4 | RRU 5 |
| Logical resource | Cell 0 | Cell 0 | Cell 0 | Cell 1 | Cell 1 | Cell 1 |

According to the mapping relationship shown in Table 3, the RRU 0, the RRU 1, and the RRU 2 correspond to the cell 0, and the RRU 3, the RRU 4, and the RRU 5 correspond to the cell 1.

Alternatively, if logical resources of the base station include a cell 0 to a cell 5, and hardware resources included in the base station include an RRU 0 and an RRU 1, in this case, a quantity 6 of logical resources is greater than a quantity 2 of hardware resources, and then the auto-configuration apparatus may establish, according to the logical resource equal-allocation principle, a mapping relationship shown in Table 4.

TABLE 4

| | Logical resource | | | | | |
|---|---|---|---|---|---|---|
| | Cell 0 | Cell 1 | Cell 2 | Cell 3 | Cell 4 | Cell 5 |
| Hardware resource | RRU 0 | RRU 0 | RRU 0 | RRU 1 | RRU 1 | RRU 1 |

According to the mapping relationship shown in Table 3, the RRU 0 corresponds to the cell 0, the cell 1, and the cell 2, and the RRU 1 corresponds to the cell 3, the cell 4, and the cell 5.

It should be understood that, that the auto-configuration apparatus establishes the mapping relationship according to the hardware resource equal-allocation principle or the logical resource equal-allocation principle is merely an example implementation. In this embodiment of this application, the mapping relationship may alternatively be established according to another principle. For example, the mapping relationship may be established based on a service capability of each RRU, a service volume born by each RRU, or another hardware attribute of each RRU. This is not limited in this embodiment of this application.

Optionally, the logical mapping configuration information of the base station may be represented by using a mapping relationship between an equipment serial number of each node that needs to be configured and a logical resource corresponding to each node that needs to be configured, and all the nodes that need to be configured are in a one-to-one correspondence with the equipment serial numbers of all the nodes that need to be configured.

How the auto-configuration apparatus determines the mapping relationship based on an equipment serial number of each hardware node that needs to be configured is described below with reference to a specific embodiment.

This embodiment is performed based on the following premise: A hardware node can be uniquely determined based on an equipment serial number of the hardware node. Therefore, the auto-configuration apparatus may establish a mapping relationship between an equipment serial number of a hardware resource and a logical resource based on the equipment serial number of the hardware node, so as to uniquely determine, based on the equipment serial number in the mapping relationship, a logical resource corresponding to the hardware node.

For example, a correspondence between each hardware node and an equipment serial number corresponding to the hardware node may be represented in a manner shown in Table 5.

TABLE 5

| | RRU name | | | | | |
|---|---|---|---|---|---|---|
| | RRU 101 | RRU 102 | RRU 103 | RRU 104 | RRU 105 | RRU 106 |
| Equipment serial number | ESN 222 | ESN 223 | ESN 224 | ESN 225 | ESN 226 | ESN 227 |

It can be learned from the correspondence shown in Table 5 that, a corresponding RRU can be uniquely determined based on an equipment serial number. Therefore, a corresponding hardware resource can be uniquely determined by using an equipment serial number.

Based on the correspondence shown in Table 5 that is between a hardware node and an equipment serial number corresponding to the hardware node, the auto-configuration apparatus may establish a mapping relationship shown in Table 6 that is between a hardware resource and a logical resource, namely, the logical mapping configuration relationship.

TABLE 6

| | Equipment serial number | | | | | |
|---|---|---|---|---|---|---|
| | ESN 222 | ESN 223 | ESN 224 | ESN 225 | ESN 226 | ESN 227 |
| Cell number | Cell 1 | Cell 1 | Cell 1 | Cell 2 | Cell 2 | Cell 2 |

It can be learned from Table 6 that the base station can determine, based on an equipment serial number, a logical resource corresponding to a hardware resource identified by the equipment serial number. For example, if an equipment serial number of a hardware resource is ESN 225, it may be determined that a logical resource corresponding to an RRU 104 identified by ESN 225 is a cell 2.

It should be noted that the auto-configuration apparatus may alternatively establish the mapping relationship based on other indication information that can uniquely identify a hardware resource. This is not limited in this embodiment of this application.

S250. The auto-configuration apparatus sends the physical configuration information of the base station and the logical mapping configuration information of the base station to the base station.

S260. The base station configures, based on the physical configuration information of the base station and the logical mapping configuration information of the base station, each node that needs to be configured.

Specifically, after determining the physical configuration information of the base station and the logical mapping configuration information of the base station, the auto-configuration apparatus may send the physical configuration information of the base station and the logical mapping configuration information of the base station to the base station, so that the base station can configure, based on the physical configuration information of the base station and the logical mapping configuration information of the base station, each node that needs to be configured. Specifically, topology information, hardware attribute information, and a corresponding logical resource of each node that needs to be configured may be configured, so that each node that needs to be configured can transmit a service on the corresponding logical resource.

Therefore, according to the auto-configuration method in this embodiment of this application, the base station may report the inventory configuration information of the base station to the auto-configuration apparatus, so that the auto-configuration apparatus may determine the physical configuration information of the base station and the logical mapping configuration information of the base station based on the inventory configuration information of the base station, and then send the determined physical configuration information and logical mapping configuration information of the base station to the base station. In this way, the base station can configure, based on the physical configuration information and the logical mapping configuration information of the base station, each node that needs to be configured. Therefore, the control node and each hardware node included in the base station do not need to be manually configured one by one, so that configuration duration of the base station can be shortened.

Optionally, the method 200 may further include:
receiving, by the auto-configuration apparatus, configuration change information sent by the base station, where the configuration change information indicates that physical configuration information of the at least one hardware node changes; and
determining, by the auto-configuration apparatus, incremental configuration information of the base station based on the configuration change information, where the incremental configuration information of the base station is used to configure the at least one hardware node that changes.

Specifically, the control node in the base station may determine, by periodically scanning each hardware node, whether physical configuration information of a hardware node included in the base station changes. In the following cases, the control node may determine that the physical configuration information of the at least one hardware node changes, for example, a case in which an RRU is newly added, a case in which an RRU is deleted, or a case in which a port connected to an RRU changes. When the control node determines that the physical configuration information of the hardware node changes, the base station sends the configuration change information to the auto-configuration apparatus, and the configuration change information may indicate that the physical configuration information of the hardware node included in the base station changes. Optionally, the configuration change information may further include specific change information, for example, information indicating that an RRU 102 is newly added, and information indicating that a port connected to an RRU 103 is switched from a port 2 to a port 5. After receiving the configuration change information, the auto-configuration apparatus may determine the incremental configuration information of the base station based on the configuration change information. Changed physical configuration information is not used to reconfigure all hardware nodes after the changed physical configuration information is generated. Instead, the incremental configuration information of the base station is used by the base station to configure only a changed hardware node. Therefore, when physical configuration information of some nodes in the base station changes, configuration duration of the base station can be shortened according to the auto-configuration method in this embodiment of this application.

The auto-configuration method according to the embodiment of this application is described above in detail with reference to FIG. 2. An auto-configuration apparatus according to an embodiment of this application is described below in detail with reference to FIG. 4 to FIG. 7.

Figure 4:
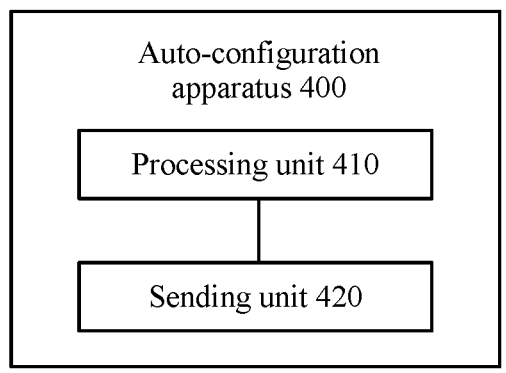
FIG. 4 is a schematic block diagram of an auto-configuration apparatus according to an embodiment of this application.

An embodiment of this application provides an auto-configuration apparatus, and a schematic block diagram of the auto-configuration apparatus may be FIG. 4. FIG. 4 is a schematic block diagram of an auto-configuration apparatus 400 according to an embodiment of this application. As shown in FIG. 4, the auto-configuration apparatus 400 includes a processing unit 410 and a sending unit 420.

Optionally, the processing unit 410 may be configured to determine physical configuration information of a base station, where the base station includes a control node and at least one hardware node, the physical configuration information of the base station indicates topology information and hardware attribute information of each node that needs to be configured, and all the nodes that need to be configured include some or all of the at least one hardware node.

The processing unit 410 may be further configured to determine logical mapping configuration information of the base station, where the logical mapping configuration information of the base station indicates a mapping relationship between a hardware resource included in the base station and a logical resource corresponding to the hardware resource, and the hardware resource includes each node that needs to be configured.

The sending unit 420 is configured to send the physical configuration information of the base station and the logical mapping configuration information of the base station to the base station, so that the base station configures, based on the physical configuration information of the base station and the logical mapping configuration information of the base station, each node that needs to be configured.

Specifically, the auto-configuration apparatus 400 may correspond to the auto-configuration apparatus in the auto-configuration method 200 according to the embodiment of this application, and the auto-configuration apparatus 400 may include units configured to perform a method performed by the auto-configuration apparatus in the method 200 in FIG. 2. In addition, the units in the auto-configuration apparatus 400 and the foregoing other operations and/or functions are separately intended to implement corresponding procedures of the method 200 in FIG. 2. For brevity, details are not described herein again.

Figure 5:
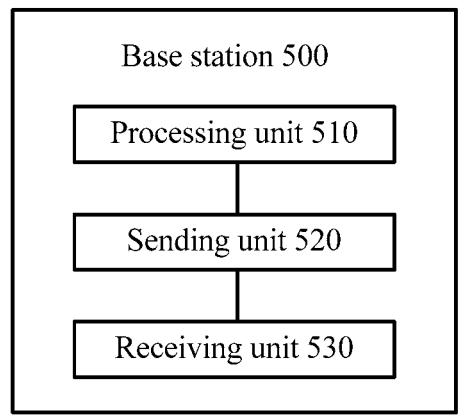
FIG. 5 is a schematic block diagram of a base station according to an embodiment of this application.

An embodiment of this application provides a base station, and a schematic block diagram of the base station may be FIG. 5. FIG. 5 is a schematic block diagram of a base station 500 according to an embodiment of this application. As shown in FIG. 5, the base station 500 includes a processing unit 510, a sending unit 520, and a receiving unit 530.

Optionally, the processing unit 510 may be configured to obtain inventory configuration information of the base station, where the base station includes a control node and at least one hardware node, the inventory configuration information of the base station includes inventory configuration information of the at least one hardware node, and inventory configuration information of each hardware node indicates topology information and hardware attribute information of each hardware node.

The sending unit 520 may be configured to send the inventory configuration information of the base station to an auto-configuration apparatus, where the inventory configuration information of the base station is used to determine physical configuration information of the base station, the physical configuration information of the base station indicates topology information and hardware attribute information of each node that needs to be configured, and all the nodes that need to be configured include some or all of the at least one hardware node.

The receiving unit 530 may be configured to receive the physical configuration information of the base station and logical mapping configuration information of the base station that are sent by the auto-configuration apparatus, where the logical mapping configuration information of the base station indicates a mapping relationship between a hardware resource included in the base station and a logical resource corresponding to the hardware resource, and the hardware resource includes each node that needs to be configured.

The processing unit 510 is further configured to configure, based on the physical configuration information of the base station and the logical mapping configuration information of the base station, each node that needs to be configured.

Specifically, the base station 500 may correspond to the base station in the auto-configuration method 200 according to the embodiment of this application, and the base station 500 may include units configured to perform a method performed by the base station in the method 200 in FIG. 2. In addition, the units in the base station 500 and the foregoing other operations and/or functions are separately intended to implement corresponding procedures of the method 200 in FIG. 2. For brevity, details are not described herein again.

Figure 6:
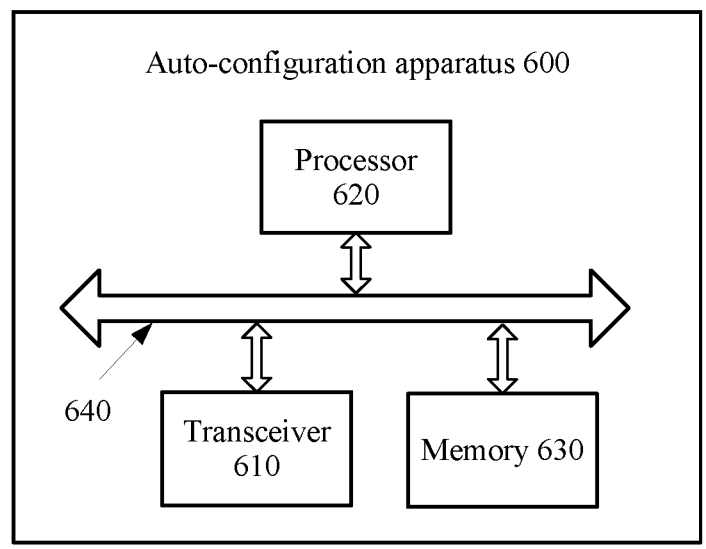
FIG. 6 is a schematic block diagram of an auto-configuration apparatus according to another embodiment of this application.

An embodiment of this application further provides an auto-configuration apparatus, and a schematic block diagram of the auto-configuration apparatus may be FIG. 6. FIG. 6 is a schematic block diagram of an auto-configuration apparatus 600 according to another embodiment of this application. As shown in FIG. 6, the auto-configuration apparatus 600 includes a transceiver 610, a processor 620, a memory 630, and a bus system 640. The transceiver 610, the processor 620, and the memory 630 are connected by using the bus system 640, the memory 630 is configured to store an instruction, and the processor 620 is configured to execute the instruction stored in the memory 630, so as to control the transceiver 610 to receive or send a signal. The memory 630 may be disposed in the processor 620, or may be independent of the processor 620.

Specifically, the auto-configuration apparatus 600 may correspond to the auto-configuration apparatus in the auto-configuration method 200 according to the embodiment of this application, and the auto-configuration apparatus 600 may include entity units configured to perform a method performed by the auto-configuration apparatus in the method 200 in FIG. 2. In addition, the entity units in the auto-configuration apparatus 600 and the foregoing other operations and/or functions are separately intended to implement corresponding procedures of the method 200 in FIG. 2. For brevity, details are not described herein again.

Figure 7:
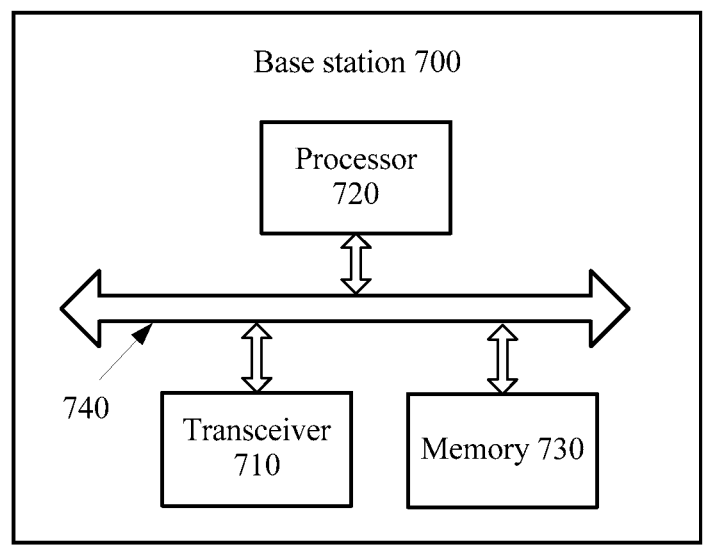
FIG. 7 is a schematic block diagram of a base station according to another embodiment of this application.

An embodiment of this application further provides a base station, and a schematic block diagram of the base station may be FIG. 7. FIG. 7 is a schematic block diagram of a base station 700 according to another embodiment of this application. As shown in FIG. 7, the base station 700 includes a transceiver 710, a processor 720, a memory 730, and a bus system 740. The transceiver 710, the processor 720, and the memory 730 are connected by using the bus system 740, the memory 730 is configured to store an instruction, and the processor 720 is configured to execute the instruction stored in the memory 730, so as to control the transceiver 710 to receive or send a signal. The memory 730 may be disposed in the processor 720, or may be independent of the processor 720.

Specifically, the base station 700 may correspond to the base station in the auto-configuration method 200 according to the embodiment of this application, and the base station 700 may include entity units configured to perform a method performed by the base station in the method 200 in FIG. 2. In addition, the entity units in the base station 700 and the foregoing other operations and/or functions are separately intended to implement corresponding procedures of the method 200 in FIG. 2. For brevity, details are not described herein again.

It should be understood that the processor in the embodiments of this application may be an integrated circuit chip, and has a signal processing capability. In an implementation process, steps in the foregoing method embodiment can be implemented by using a hardware integrated logical circuit in the processor, or by using instructions in a form of software. The foregoing processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the method, the steps, and logical block diagrams that are disclosed in the embodiments of this application. The general purpose processor may be a microprocessor, or the processor may be any conventional processor or the like. Steps of the method disclosed with reference to the embodiments of this application may be directly performed and accomplished by a hardware decoding processor, or may be performed and accomplished by using a combination of hardware and a software unit in the decoding processor. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and the volatile memory is used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAMort), and a direct rambus random access memory (DR RAM). It should be noted that the memory of the systems and method described in this specification includes but is not limited to these and any memory of another proper type.

It should be further understood that, the bus system may further include a power bus, a control bus, a status signal bus, and the like, in addition to a data bus. However, for clear description, various types of buses in the figure are marked as the bus system.

In an implementation process, steps in the foregoing method can be implemented by using a hardware integrated logical circuit in the processor, or by using instructions in a form of software. The steps of the auto-configuration method disclosed with reference to the embodiments of this application may be directly performed and accomplished by a hardware processor, or may be performed and accomplished by using a combination of hardware and a software unit in the processor. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor. To avoid repetition, details are not described herein.

An embodiment of this application further provides a computer-readable storage medium. The computer-readable storage medium stores one or more programs, and the one or more programs include an instruction. When being executed by a portable electronic device including a plurality of application programs, the instruction enables the portable electronic device to perform the method in the embodiment shown in FIG. 2.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An auto-configuration method, comprising:
    determining physical configuration information of a base station, wherein the base station comprises a control node and at least one hardware node, wherein the physical configuration information of the base station indicates topology information and hardware attribute information of each node that needs to be configured, wherein nodes that need to be configured comprise at least one of the at least one hardware node, and wherein the topology information of each node that needs to be configured indicates a connection relationship among the nodes that need to be configured;

determining logical mapping configuration information of the base station, wherein the logical mapping configuration information of the base station indicates a mapping relationship between a hardware resource comprised in the base station and a logical resource corresponding to the hardware resource, wherein the hardware resource comprises each node that needs to be configured, and wherein the logical resource is usable by each node that needs to be configured to transmit a service; and sending the physical configuration information of the base station and the logical mapping configuration information of the base station to the base station, wherein the base station configures, based on the physical configuration information of the base station and the logical mapping configuration information of the base station, each node that needs to be configured.

2. The method according to claim 1, wherein the determining physical configuration information of a base station comprises:

receiving inventory configuration information of the base station that is sent by the base station, wherein the inventory configuration information of the base station comprises inventory configuration information of the at least one hardware node, and wherein inventory configuration information of each hardware node indicates topology information and hardware attribute information of each hardware node; and determining the physical configuration information of the base station based on the inventory configuration information of the base station.

3. The method according to claim 2, wherein the determining the physical configuration information of the base station based on the inventory configuration information of the base station comprises:

comparing the inventory configuration information of the base station with prestored configuration information of the base station;

newly adding configuration information of a first hardware node to the prestored configuration information of the base station based on inventory configuration information of the first hardware node if the inventory configuration information of the base station comprises the inventory configuration information of the first hardware node and the prestored configuration information of the base station comprises no configuration information of the first hardware node;

determining inventory configuration information of a second hardware node as configuration information of the second hardware node in the prestored configuration information of the base station if the inventory configuration information of the second hardware node that is comprised in the inventory configuration information of the base station is inconsistent with the configuration information of the second hardware node that is comprised in the prestored configuration information of the base station;

deleting configuration information of a third hardware node in the prestored configuration information of the base station if the inventory configuration information of the base station comprises no inventory configuration information of the third hardware node and the prestored configuration information of the base station comprises the configuration information of the third hardware node;

keeping configuration information of a fourth hardware node in the prestored configuration information of the base station if inventory configuration information of the fourth hardware node that is comprised in the inventory configuration information of the base station is consistent with the configuration information of the fourth hardware node that is comprised in the prestored configuration information of the base station; and determining updated prestored configuration information of the base station as the physical configuration information of the base station.

4. The method according to claim 1, wherein the determining logical mapping configuration information of the base station comprises:

determining a quantity of nodes that need to be configured;

determining a quantity of available logical resources; and determining the mapping relationship according to a hardware resource equal-allocation principle if the quantity of nodes that need to be configured is greater than the quantity of available logical resources; or determining the mapping relationship according to a logical resource equal-allocation principle if the quantity of nodes that need to be configured is not greater than the quantity of available logical resources.

5. The method according to claim 1, wherein the logical mapping configuration information of the base station is represented by using a mapping relationship between an equipment serial number of each node that needs to be configured and a logical resource corresponding to each node that needs to be configured, and wherein the nodes that need to be configured are in a one-to-one correspondence with the equipment serial numbers of the nodes that need to be configured.

6. The method according to claim 1, wherein the method further comprises:

receiving configuration change information sent by the base station, wherein the configuration change information indicates that physical configuration information of the at least one hardware node changes; and determining incremental configuration information of the base station based on the configuration change information, wherein the incremental configuration information of the base station is used to configure the at least one hardware node that changes.

7. An auto-configuration method, comprising:

obtaining, by a base station, inventory configuration information of the base station, wherein the base station comprises a control node and at least one hardware node, wherein the inventory configuration information of the base station comprises inventory configuration information of the at least one hardware node, wherein inventory configuration information of each hardware node indicates topology information and hardware attribute information of each hardware node, and wherein the topology information of each hardware node indicates a connection relationship among the at least one hardware node;

sending, by the base station, the inventory configuration information of the base station to an auto-configuration apparatus, wherein the inventory configuration information of the base station is used to determine physical configuration information of the base station, wherein the physical configuration information of the base station indicates topology information and hardware attribute information of each node that needs to be configured, wherein nodes that need to be configured comprise at least one of the at least one hardware node, and wherein the logical resource is usable by each node that needs to be configured to transmit a service;

receiving, by the base station, the physical configuration information of the base station and logical mapping configuration information of the base station that are sent by the auto-configuration apparatus, wherein the logical mapping configuration information of the base station indicates a mapping relationship between a hardware resource comprised in the base station and a logical resource corresponding to the hardware resource, and wherein the hardware resource comprises each node that needs to be configured; and configuring, by the base station and based on the physical configuration information of the base station and the logical mapping configuration information of the base station, each node that needs to be configured.

8. The method according to claim 7, wherein the obtaining, by a base station, inventory configuration information of the base station comprises:

obtaining, by the control node, a relative location of the at least one hardware node by scanning the at least one hardware node;

obtaining, by the control node, topology information of the at least one hardware node based on the relative location of the at least one hardware node; and obtaining, by the control node, hardware attribute information of the at least one hardware node based on identifier information of the at least one hardware node, wherein the identifier information of the at least one hardware node is in a one-to-one correspondence with the at least one hardware node.

9. The method according to claim 7, wherein the logical mapping configuration information of the base station is represented by using a mapping relationship between an equipment serial number of each node that needs to be configured and a logical resource corresponding to each node that needs to be configured, and wherein the nodes that need to be configured are in a one-to-one correspondence with the equipment serial numbers of the nodes that need to be configured.

10. An auto-configuration apparatus, comprising:

at least one processor, the at least one processor configured to:

determine physical configuration information of a base station, wherein the base station comprises a control node and at least one hardware node, wherein the physical configuration information of the base station indicates topology information and hardware attribute information of each node that needs to be configured, wherein nodes that need to be configured comprise at least one of the at least one hardware node, and wherein the topology information of each node that needs to be configured indicates a connection relationship among the nodes that need to be configured; and determine logical mapping configuration information of the base station, wherein the logical mapping configuration information of the base station indicates a mapping relationship between a hardware resource comprised in the base station and a logical resource corresponding to the hardware resource, wherein the hardware resource comprises each node that needs to be configured, and wherein the logical resource is usable by each node that needs to be configured to transmit a service; and a transmitter, the transmitter configured to send the physical configuration information of the base station and the logical mapping configuration information of the base station to the base station, wherein the base station configures, based on the physical configuration information of the base station and the logical mapping configuration information of the base station, each node that needs to be configured.

11. The apparatus according to claim 10, wherein the apparatus further comprises:

a receiver, the receiver configured to receive inventory configuration information of the base station that is sent by the base station, wherein the inventory configuration information of the base station comprises inventory configuration information of the at least one hardware node, and wherein inventory configuration information of each hardware node indicates topology information and hardware attribute information of each hardware node; and wherein the at least one processor is configured to determine the physical configuration information of the base station based on the inventory configuration information of the base station.

12. The apparatus according to claim 11, wherein the at least one processor is further configured to:

compare the inventory configuration information of the base station with prestored configuration information of the base station;

newly add configuration information of a first hardware node to the prestored configuration information of the base station based on inventory configuration information of the first hardware node if the inventory configuration information of the base station comprises the inventory configuration information of the first hardware node and the prestored configuration information of the base station comprises no configuration information of the first hardware node;

determine inventory configuration information of a second hardware node as configuration information of the second hardware node in the prestored configuration information of the base station if the inventory configuration information of the second hardware node that is comprised in the inventory configuration information of the base station is inconsistent with the configuration information of the second hardware node that is comprised in the prestored configuration information of the base station;

delete configuration information of a third hardware node in the prestored configuration information of the base station if the inventory configuration information of the base station comprises no inventory configuration information of the third hardware node and the prestored configuration information of the base station comprises the configuration information of the third hardware node;

keep configuration information of a fourth hardware node in the prestored configuration information of the base station if inventory configuration information of the fourth hardware node that is comprised in the inventory configuration information of the base station is consistent with the configuration information of the fourth hardware node that is comprised in the prestored configuration information of the base station; and determine updated prestored configuration information of the base station as the physical configuration information of the base station.

13. The apparatus according to claim 10, wherein the at least one processor is further configured to:
   determine a quantity of nodes that need to be configured;
   determine a quantity of available logical resources; and
   determine the mapping relationship according to a hardware resource equal-allocation principle if the quantity of nodes that need to be configured is greater than the quantity of available logical resources; or
   determine the mapping relationship according to a logical resource equal-allocation principle if the quantity of nodes that need to be configured is not greater than the quantity of available logical resources.

14. The apparatus according to claim 10, wherein the logical mapping configuration information of the base station is represented by using a mapping relationship between an equipment serial number of each node that needs to be configured and a logical resource corresponding to each node that needs to be configured, and wherein the nodes that need to be configured are in a one-to-one correspondence with the equipment serial numbers of the nodes that need to be configured.

15. The apparatus according to claim 10, wherein the apparatus further comprises a receiver configured to:
   receive configuration change information sent by the base station, wherein the configuration change information indicates that physical configuration information of the at least one hardware node changes; and
   wherein the at least one processor is further configured to determine incremental configuration information of the base station based on the configuration change information, wherein the incremental configuration information of the base station is used to configure the at least one hardware node that changes.

\* \* \* \* \*